March 6, 1962    F. W. BROWN    3,023,518
SIMULATED FUSE TEACHING DEVICE
Filed Aug. 30, 1960    2 Sheets-Sheet 1

INVENTOR.
FORREST W. BROWN
BY Ervin B. Steinberg
AGENT.

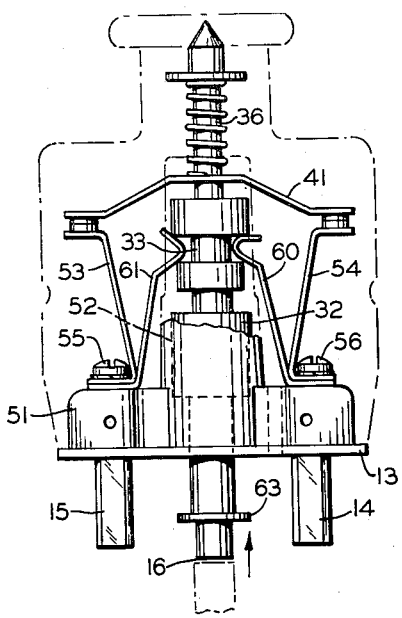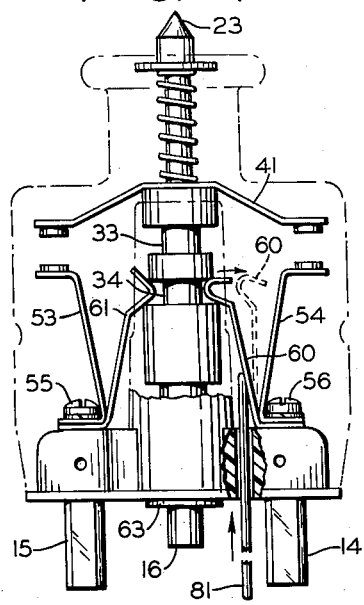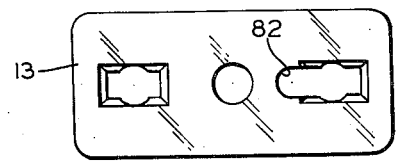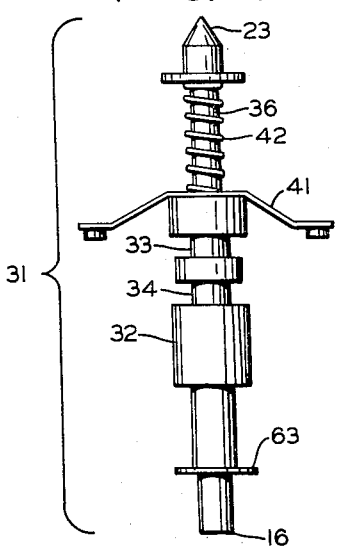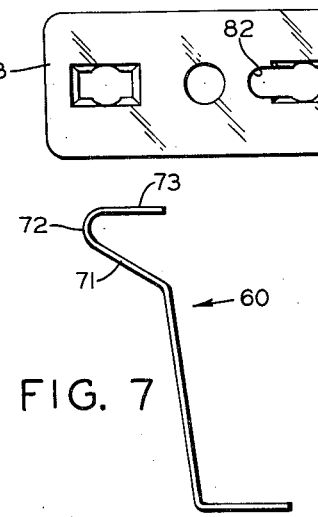
March 6, 1962 — F. W. BROWN — 3,023,518
SIMULATED FUSE TEACHING DEVICE
Filed Aug. 30, 1960 — 2 Sheets-Sheet 2
FIG. 3
FIG. 4
FIG. 5
FIG. 6
FIG. 7
INVENTOR.
FORREST W. BROWN
BY Ervin B. Steinberg
AGENT.

United States Patent Office 3,023,518
Patented Mar. 6, 1962

3,023,518
SIMULATED FUSE TEACHING DEVICE
Forrest W. Brown, New Canaan, Conn., assignor to Reflectone Electronics, Inc., Stamford, Conn., a corporation of Connecticut
Filed Aug. 30, 1960, Ser. No. 52,967
4 Claims. (Cl. 35—19)

This invention relates to a simulated fuse teaching device consisting primarily of a simulated aircraft fuse which controls a student's signal device and which is constructed so that an instructor may remotely change the condition of the fuse from good to defective.

The main object of this invention is the provision of a simulated fuse teaching device which will teach a student what to do and how to analyze the different significances in the condition of the fuse when the latter, in simulated fashion, is connected to a simulated piece of apparatus which the student is taught to control. Other objects of the invention and practical solutions thereof are described in detail in the following specification and are illustrated in the accompanying drawings in which:

FIGURE 3 is an elevational side view of the fuse simulator with the housing removed to reveal the interior construction of the simulated fuse when the fuse is operative;

FIGURE 4 is an elevational side view of the interior mechanism of the fuse simulator when the fuse has been rendered defective and indicating also how the fuse may be reset;

FIGURE 5 is a plan view of the underside of the fuse body;

FIGURE 6 is an enlarged elevational side view of the plunger assembly which forms a part of the fuse assembly; and FIGURE 7 is an enlarged side view of one of the bias springs which engages the plunger assembly.

It is known that modern aircraft contain a multitude of fuses, each fuse requiring periodic checking at prescribed times for instance, prior to take-off, in flight, prior to landing, and so forth. When one of the fuses is found defective, the defective fuse must be removed from its holder and replaced by a new one and in many instances, the cause for the "blown" fuse must be established.

In connection with the construction of flight simulators it is necessary to provide fuse panels and fuses which in appearance and action are identical with operational equipment. Two factors however, preclude the use of operational fuses in this type of equipment. First, the fuses are quite expensive and inasmuch as fuses must be blown in order to condition a student to this environment, a training operation would have to include the expenditure for replacing a sizable quantity of fuses. Second, operational fuses are rated at 10 amperes and more so that a comparatively large amount of current is required to deactivate a fuse. Flight simulators and procedure trainers usually do not operate with currents of this magnitude so that no provisions are available for "blowing" an operational fuse.

It has been found desirable therefore, to provide a simulated fuse which in its appearance and manifestations resembles the operational device yet which can be transformed to its defective state by relatively simple means, primarily by control means located at an instructor's station. Additionally, the fuse simulator may be reset to its original good condition by authorized personnel while precluding the student from transforming a "blown" fuse to a good fuse. In this manner fuses may be re-used while providing to a student however, the illusion of a single-use fuse.

Figure 1:
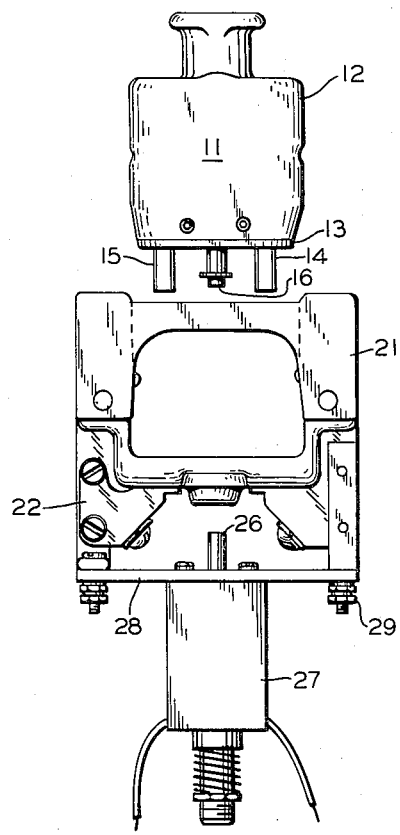
FIGURE 1 is an elevational side view of the simulated fuse teaching device with the fuse removed from its socket.

Referring now to the figures and FIGURE 1 in particular, numeral 11 identifies the simulated fuse teaching device comprising essentially a rectangular ceramic enclosure 12, a ceramic bottom plate 13, and two electrical connector pins 14 and 15 which are extending from the bottom plate. Additionally, the simulated fuse teaching device is provided with the protruding end 16 of a plunger extending from the bottom plate 13.

The simulated fuse teaching device 11 as shown in FIGURE 1, except for the protruding plunger end 16, resembles in appearance the operational, commercially available aircraft fuse. This fuse, normally as well as for training purposes is inserted into a conventional fuse socket 21, which socket is mounted to a conventional and operational fuseholder 22. The operational fuse within its ceramic body 12 contains a fuse wire which when melted by excessive current flowing therethrough, causes a sharp point 23 (FIGURE 2) to protrude from the upper end of the fuse enclosure. A pilot when checking fuses, some of which are disposed in hidden areas, moves his hand across the array of fuses, and whenever he feels such a sharp point, removes the respective fuse from its socket and replaces it with a new fuse which has this sharp point concealed, being withdrawn in the fuse body as shown in FIGURE 1.

Figure 2:
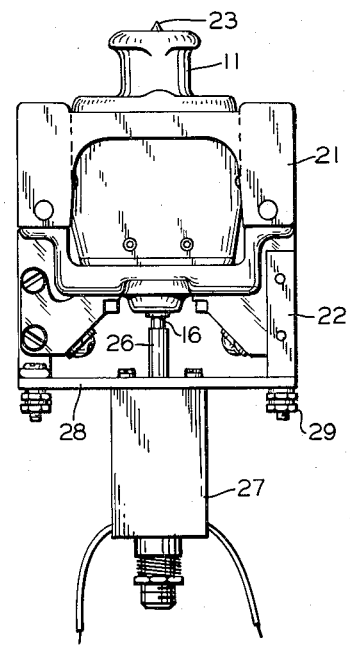
FIGURE 2 is an elevational side view of the fuse teaching device when the fuse is inserted in its socket and the fuse is rendered defective.

As has been pointed out previously the actual "blowing" of fuses is not possible in the majority of teaching devices due to the absence of the necessary currents and because of the expense involved in replacing operational fuses. For this reason the simulated fuse teaching device is redesigned to exhibit a plunger whose lower end 16 is linked to sharp point 23. The plunger end is adapted to be engaged by the actuating rod 26 of an electromagnetic solenoid 27 which is mounted to the fuseholder by means of a fiber plate 28 and screw fastening means 29. Point 23 normally is withdrawn in the fuse body, thereby simulating a "good" fuse. Upon energizing solenoid 27 from a remote instructor station, actuating rod 26 is raised to engage plunger end 16, causing it to be raised, which action in turn causes point 23 to assume its protruding condition to signify a "blown" fuse. This status is depicted in FIGURE 2.

FIGURES 3 through 7 show the details of the simulated fuse teaching device. The majority of these items is not contained in the operational fuse since, as has been described previously, the interior of the operational fuse contains primarily a fusible wire.

Numeral 31, FIGURE 6, refers to the plunger assembly which is adapted to move within the fuse body. The lower end of the plunger is made of fiber material and comprises as its main portions a lower end 16, a round main body portion 32, and two axially spaced, circular recesses 33 and 34. A round metallic pin 36 is press fitted into the fiber body and this pin incorporates at its upper end the sharp point 23 previously identified in conjunction with FIGURE 2.

Additionally, the plunger assembly carries a resilient contact leaf 41 having an electrical contact point at either end. A helical compression spring 42 surrounding pin 36 serves to bias the leaf against the shoulder of the fiber portion of the plunger.

The plunger assembly per FIGURE 6 is retained in a ceramic frame 51, FIGURE 3, which frame includes an axial bore 52 for guiding the plunger portion 32 in its longitudinal motion. Contact leaf 41 is adapted to engage a pair of stationary contact springs with associated contact points, numerals 53 and 54. These stationary contacts are secured to the ceramic frame body 51 by means of screws 55 and 56 which in turn are in electrical contact with respective connector pins 15 and 14. When the fuse is in its "good" condition as shown in FIGURE 3, electrical continuity is established between connector pins 15 and 14 via stationary contact 53, leaf spring 41 and stationary contact 54. When an electrical circuit is established from pin 15 to pin 14, the fuse is in its operational condition and this status is sensed by the circuit associated with the training device, particularly a tell-tale indication at the intructor station. Additionally, by means of an auxiliary relay connected to pins 15 and 14, simulation equipment normally associated with the respective operational fuse is rendered operative or inoperative depending upon the status of the fuse.

The fuse when operative, is so constructed that a set of leaf springs, numerals 60 and 61, mounted to screws 56 and 55 respectively engages the upper recess 33 of plunger assembly 31. The plunger thus is retained in its lowered position when there is an electrical circuit from connector pin 15 to connector pin 14 as shown in FIGURE 3.

When solenoid 27 is energized by remote control from the instructor station, actuator 26 engages lower end 16 of plunger assembly 31 and causes the plunger assembly to be raised so that leaf springs 60 and 61 engage the lower recess 34 and retain the plunger assembly in its raised position, in which position sharp point 23 protrudes from the body of the fuse housing. In this condition leaf 41 has been raised and the electrical circuit from connector pin 15 to pin 14 is interrupted. Vertical motion of the plunger assembly is stopped by washer 63 which is so positioned as to engage the underside of plate 13 when springs 60 and 61 engage the recess 34.

FIGURE 7 shows the detailed construction of leaf spring 60. This spring at its upper end is equipped with an inclined portion 71, a rounded portion 72 and a plane portion 73. The inclined portion 71 permits the plunger to be raised, and the rounded portion 72 will then engage recess 34. Return of the plunger assembly 31 to its lowered position is prevented however, by the substantially plane portion 73 which will oppose lowering of the plunger assembly by mere exerting force on tip 23. This feature prevents the possibility of a trainee changing a "blown" fuse to a "good" fuse which action would render equipment operative. Also, in this manner a student is forced to physically replace a fuse which has been blown by instructor initiated control action.

In order to reset the simulated fuse teaching device it is necessary to remove the fuse from its associated socket and holder and insert a small round or flat bar 81 through the underside of the fuse at a specially provided opening 82 disposed in plate 13, see FIGURE 5. When bar 81 is inserted, its upper end engages the bias leaf spring 60 and breaks engagement of the spring with recess 34, this condition being depicted by the dashed position of leaf spring 60 in FIGURE 4. Since the complementary spring 61 is not provided with a corresponding horizontal portion 73 but is inclined, the plunger now can be lowered by applying a depressing force to point 23 while tool 81 holds spring 60 away from recess 34. In order to reset the fuse it is necessary therefore, to move leaf spring 60 outward using an externally applied force and simultaneously apply a force to the protruding point 23 of the plunger. A small fiber rod or the blunt end of a pencil is sufficient for restoring the plunger to its original condition.

The resetting operation usually and preferably is performed by maintenance personnel who are acquainted with the way and method of resetting fuses. In this manner, fuses rendered inoperative by the instructor cannot be reset by the student while the fuse simulator is in situ in the training device. Additionally, the contact arrangement provided in the fuse body provides suitable circuit indication for an insructor's panel and causes operation or shutdown of the simulating equipment associated with the fuse. As far as the student is concerned, the appearance and action of the fuse is identical with the procedures and manifestations in the actual aircraft, thus providing complete and realistic training.

A further and most important facet of simulating the action of the operational fuse concerns the assigning of a simulated ampere rating to the fuse simulator and effect the condition wherein a fuse teaching device will be transformed from its operative state to its inoperative state when the device is inserted in a circuit whose current rating exceeds the simulated ampere rating of the fuse. This feature is accomplished by keying the lower end of the plunger with respect to the socket and/or actuating rod of the solenoid.

In a typical example, the low amperage fuse simulator and fuseholder 22 are so constructed that the fuseholder is countersunk for a short portion to accommodate washer 63. The corresponding fuseholder for the medium size fuse fails to exhibit the countersunk bore and the associated fuse is without a washer. It follows therefore, that when the low amperage fuse is inserted into a fuseholder normally requiring the medium size fuse, washer 63 will be actuated during physical insertion of the fuse, thus causing the fuse to assume its "blown" state. However, the medium size fuse may be inserted into the low capacity fuseholder without causing actuation of the fuse.

For the high amperage fuse simulator, washer 63 is omitted and the lower end of the plunger is provided with an internal bore to mate in telescopic fashion with a lengthened actuating rod 26 of reduced diameter. Since the plungers of the low and medium amperage fuse fail to slide over the actuating rod, not being provided with the internal bore, they will immediately be tripped. In this manner, a student is forced to observe rating of fuses and the manifested interaction of circuits and fuses is realistically duplicated.

It will be apparent that when an array of fuse simulators of this type is provided, each fuseholder is equipped with a corresponding solenoid 27 in order to selectively render the desired fuse simulator inoperative. Matrix switching circuits are used advantageously to activate these solenoids.

While there has been described a certain and preferred embodiment of the present invention, it will be apparent to those skilled in the art that various modifications and changes may be made therein without deviating from the principle and intent of the present invention which shall be limited only the scope of the appended claims.

What is claimed is:

1. A simulated fuse teaching device comprising: a housing; a plunger movable relative to said housing and being adapted to assume a first position when one end of the plunger is withdrawn into the housing and a second position when said one end is protruding from the housing; said plunger equipped with a set of axially spaced recesses; a set of leaf springs adapted to engage said recesses to secure said plunger selectively in either the first or the second position; a set of movable and stationary electrical contact means within said housing and adapted to be connected to a circuit whose condition is responsive to the position of said movable contact means; one of said contact means secured to and operated by the motion of the plunger whereby the contact means assume a first condition when the plunger is in its first position and a second condition when the plunger is in the second position; the other end of the plunger adapted to be engaged by remote controlled motive means disposed exterior of said housing in order to move said plunger from its first position to its second position; at least one of said leaf springs being shaped with respect to said recesses to preclude the return of the plunger from its second position to the first position solely by force applied to the plunger at said one end, and an aperture in said housing for applying an externally controlled force to said one leaf spring to deflect said leaf spring away from engagement with the respective recess when the plunger is in its second position in order to return the plunger to its first position upon application of force to said one plunger end.

2. A simulated fuse teaching device comprising in combination a simulated fuse adapted to be inserted into a socket; said fuse including a housing; a plunger movable relative to said housing and being adapted to assume a first position when a pointed end of the plunger is withdrawn into the housing and a second position when said pointed end is protruding from the housing; said plunger equipped with a set of axially spaced recesses; a set of leaf springs adapted to engage said recesses to secure said plunger selectively in either the first or the second position; a set of movable and stationary electrical contact means within said housing and adapted to be connected to a circuit whose condition is responsive to the position of said movable contact means; one of said contact means secured to and operated by the motion of the plunger whereby the contact means assume a first condition when the plunger is in its first position and a second condition when the plunger is in the second position; the opposite end of the plunger adapted to be engaged by actuating means disposed exterior of said housing and mounted to said socket in order to move said plunger from its first position to its second position; at least one of said leaf springs being shaped with respect to said recesses to preclude the return of the plunger from its second position to the first position solely by force applied to the plunger at said pointed end; an aperture in said housing for applying an externally controlled force to said one leaf spring to deflect said leaf spring away from engagement with the respective recess when the plunger is in its second position in order to return the plunger to its first position upon application of force to said pointed plunger end, and said opposite plunger end being provided with keying means to signify a simulated current rating of the simulated fuse.

3. A simulated fuse teaching device comprising in combination a simulated plug-in type fuse and a socket; said fuse including a housing; a plunger movable relative to said housing and being adapted to assume a first position when a pointed end of the plunger is withdrawn into the housing and a second position when said pointed end is protruding from the housing; said plunger equipped with a set of axially spaced recesses; a set of leaf springs adapted to engage said recesses to secure said plunger selectively in either the first or the second position; a set of movable and stationary electrical contact means within said housing and adapted to be connected to a circuit whose condition is responsive to the position of said movable contact means; one of said contact means secured to and operated by the motion of the plunger whereby the contact means assume a first condition when the plunger is in its first position and a second condition when the plunger is in the second position; at least one of said leaf springs being shaped with respect to said recesses to preclude the return of the plunger from its second position to the first position solely by force applied to the plunger at said pointed end; an aperture in said housing for applying an externally controlled force to said one leaf spring to deflect said leaf spring away from engagement with the respective recess when the plunger is in its second position in order to return the plunger to its first position upon application of force to said pointed plunger end; said socket adapted to receive said fuse; a solenoid and actuating bar mounted to said socket and said bar being urged into motion toward the fuse upon energizing said solenoid with electric energy, and said bar adapted to engage the opposite end of said plunger and when urged into motion causing the plunger to move from its first to its second position.

4. A fuse teaching device as set forth in claim 3 wherein the engaging ends of the plunger and of the bar include mutually complementary keying means which signify a simulated current rating of the fuse and socket, and said keying means cause upon insertion of the fuse into the socket, the plunger of the fuse to be moved from its first to its second position when the simulated current rating of the fuse is below that of the socket.

References Cited in the file of this patent

UNITED STATES PATENTS 2,924,890    Salisbury _____ Feb. 16, 1960